No. 840,209. PATENTED JAN. 1, 1907.
G. E. HEYL-DIA.
TIRE.
APPLICATION FILED SEPT. 29, 1905.
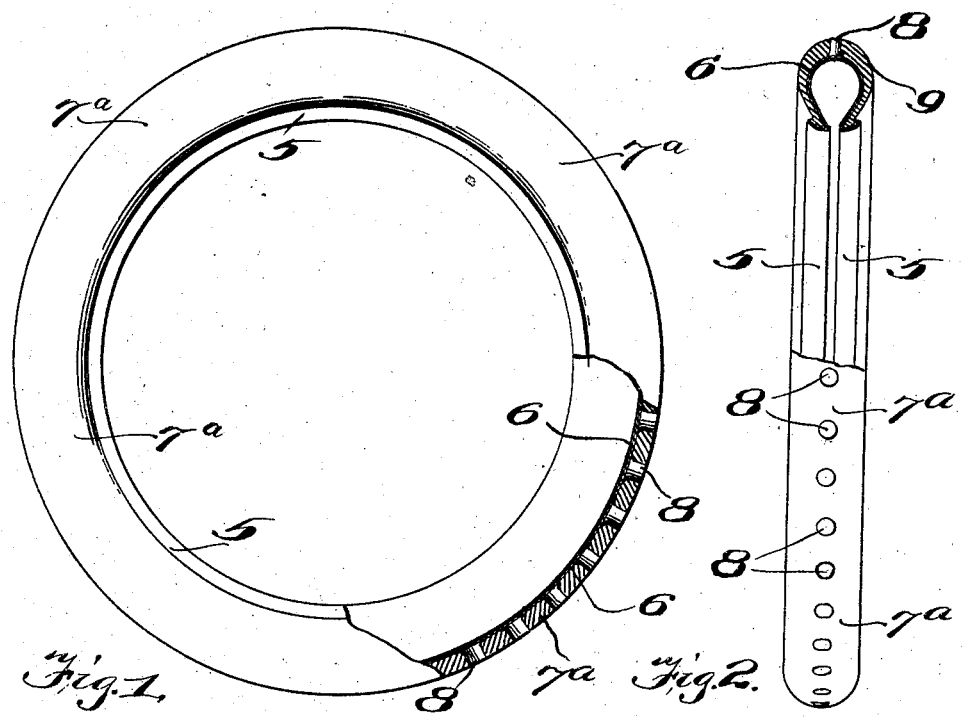
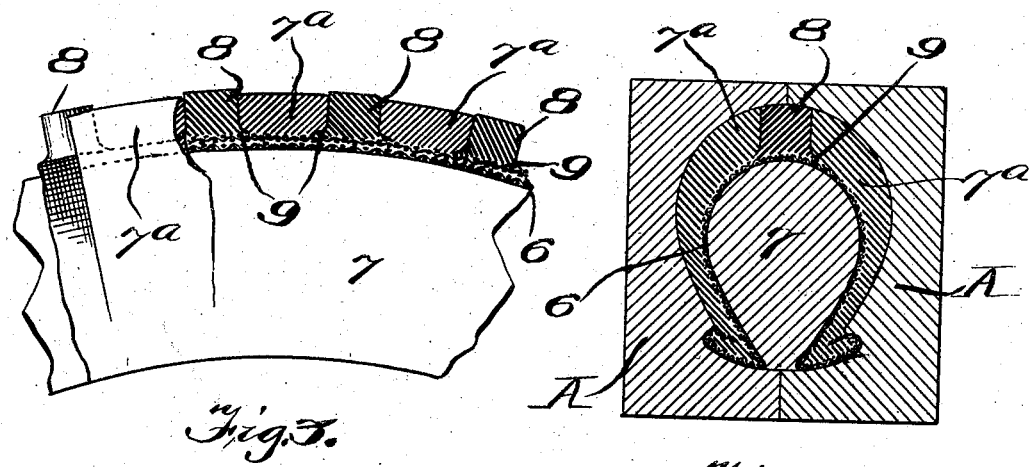

UNITED STATES PATENT OFFICE.

GEORGE EDWARD HEYL-DIA, OF STRETTON, NEAR WARRINGTON, ENGLAND.

TIRE.

No. 840,209.        Specification of Letters Patent.        Patented Jan. 1, 1907.

Application filed September 29, 1905. Serial No. 280,565.

*To all whom it may concern:*

Be it known that I, GEORGE EDWARD HEYL-DIA, a subject of the King of Great Britain, and a resident of Stretton, near Warrington, England, have invented certain new and useful Improvements in Tires, of which the following is a specification.

This invention relates to certain novel and useful improvements in the construction of rubber tires.

In the present instance I have particularly in view the construction of a non-puncturable tire and one which will embody the essential and desired features of cheapness and durability.

With the above-recited objects and others of a similar nature in view my invention consists of the construction, combination, and arrangement of parts set forth in and falling within the scope of the appended claims.

In the accompanying drawings like characters of reference indicate like parts in all the views.

Figure 1 is a view in elevation of a tire embodying my improvement. Fig. 2 is an end view of a tire, partially in elevation and partially in section. Fig. 3 is an enlarged detail view of a portion of the tire, parts of the rubber coating and canvas being broken away to show the construction of the same. Fig. 4 is a cross-sectional view of a tire embedded in a mold.

Referring now to the accompanying drawings in detail, 5 indicates the rim, of any desired character, upon which the tire 7ª is adapted to be placed. In the construction of the tire 7ª a fabric, such as canvas or the like, (shown at 6,) is wrapped upon a former, as at 7, Fig. 3, and such fabric is then coated with layers of unvulcanized mixture, each mass of rubber forming a layer containing a percentage of sulfur differing from the percentage of sulfur contained in the other layers. The tread portion or periphery of the tire is provided with studs or projections 8, designed to be embedded in and extend through the rubber layers until the base portions 9 of such studs, which are slightly enlarged, bear against the fabric. The studs 8 are intended to have their tread ends preferably project slightly beyond the tread portion of the main body of the tire. The tire after having been built up in the described manner is placed in a vulcanizing-mold, such as shown at A in Fig. 4, and vulcanized by any well-known method. The result is a tire the rubber part of which consists of layers of rubber of varying hardness, which gives great resiliency to the tire and at the same time provides a structure which is non-puncturable. The tread-studs 8 are formed of rubber also differing in hardness and resiliency from the rubber body portion of the tire, the layers of hardened rubber forming the latter being molded integral with the softer studs of the tread.

While I have herein shown and described one particular manner of forming my tire, I wish it to be understood that I do not confine myself to the precise details recited, as there may be modification and variation, so long as the principle of constructing a tire of layers of rubber of varying hardness is maintained.

Having thus described my invention, what I claim as new, and desire to secure by Letters Patent, is—

1. A tire comprising a fabric having a plurality of layers of rubber thereon, each layer differing in hardness from the others, and studs extending from the outer surface of the fabric through the rubber portion of the tire out to the tread-surface thereof.

2. A tire comprising a fabric, layers of rubber of varying hardness applied to said fabric, and rubber stud members molded into the layers of rubber and extending from the outer surface of the fabric portion of the tire through to the tread portion thereof.

3. A tire comprising a fabric provided with layers of rubber compound, each layer differing in hardness from the others and studs of relatively soft rubber embedded in the layers of rubber, to be integral therewith.

In testimony whereof I have signed my name to this specification in the presence of two subscribing witnesses.

GEORGE EDWARD HEYL-DIA.

Witnesses:
  R. B. CAVANAGH,
  JOS. J. PIERANDO.